Figure 1:
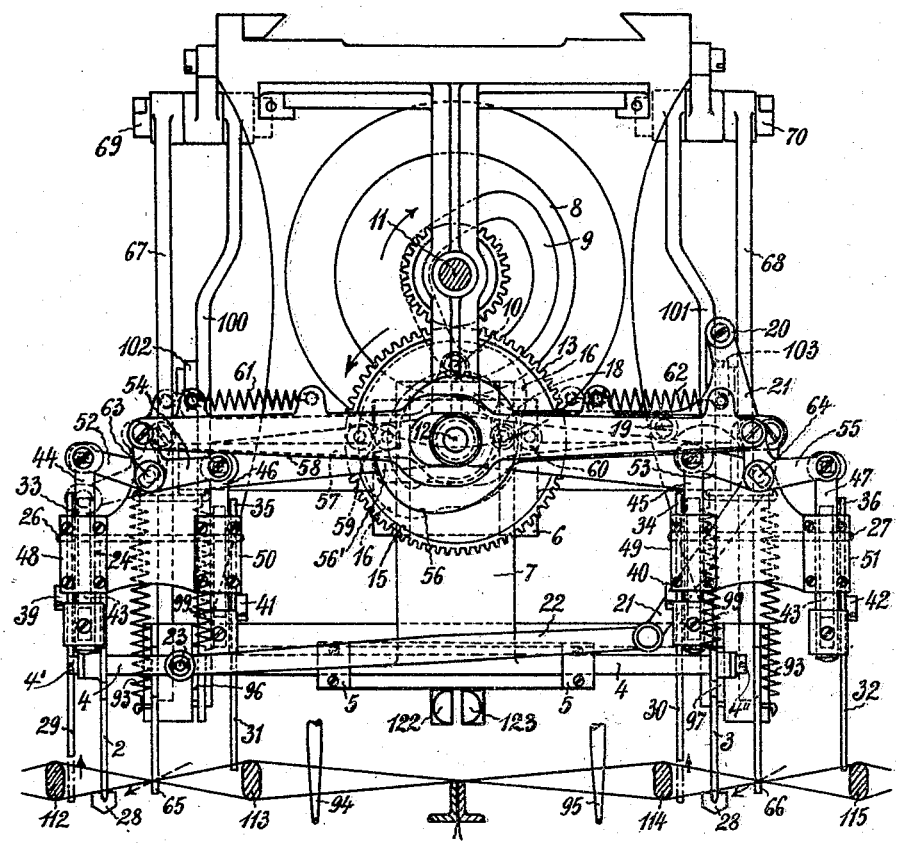

No. 787,511. PATENTED APR. 18, 1905.
G. HILLER.
WARP TWISTING MACHINE.
APPLICATION FILED JAN. 4, 1904.

8 SHEETS—SHEET 1.

Attest:
Cornaceitan
Edward Sarton

Inventor,
Gustav Hiller
By Richards &Co
Attys.

No. 787,511.  
PATENTED APR. 18, 1905.  
G. HILLER.  
WARP TWISTING MACHINE.  
APPLICATION FILED JAN. 4, 1904.

8 SHEETS—SHEET 2.

No. 787,511. PATENTED APR. 18, 1905.
G. HILLER.
WARP TWISTING MACHINE.
APPLICATION FILED JAN. 4, 1904.

8 SHEETS—SHEET 3.

Attest:

Inventor
Gustav Hiller
By Richards &
Attys

No. 787,511. PATENTED APR. 18, 1905.
G. HILLER.
WARP TWISTING MACHINE.
APPLICATION FILED JAN. 4, 1904.

8 SHEETS—SHEET 4.

Attest.
Edward Sarton

Inventor.
Gustav Hiller.
By Richards & Co
Atty's

No. 787,511. PATENTED APR. 18, 1905.
G. HILLER.
WARP TWISTING MACHINE.
APPLICATION FILED JAN. 4, 1904.

8 SHEETS—SHEET 5.

No. 787,511. PATENTED APR. 18, 1905.
G. HILLER.
WARP TWISTING MACHINE.
APPLICATION FILED JAN. 4, 1904.

8 SHEETS—SHEET 6.

No. 787,511. PATENTED APR. 18, 1905.
G. HILLER.
WARP TWISTING MACHINE.
APPLICATION FILED JAN. 4, 1904.
8 SHEETS—SHEET 7.
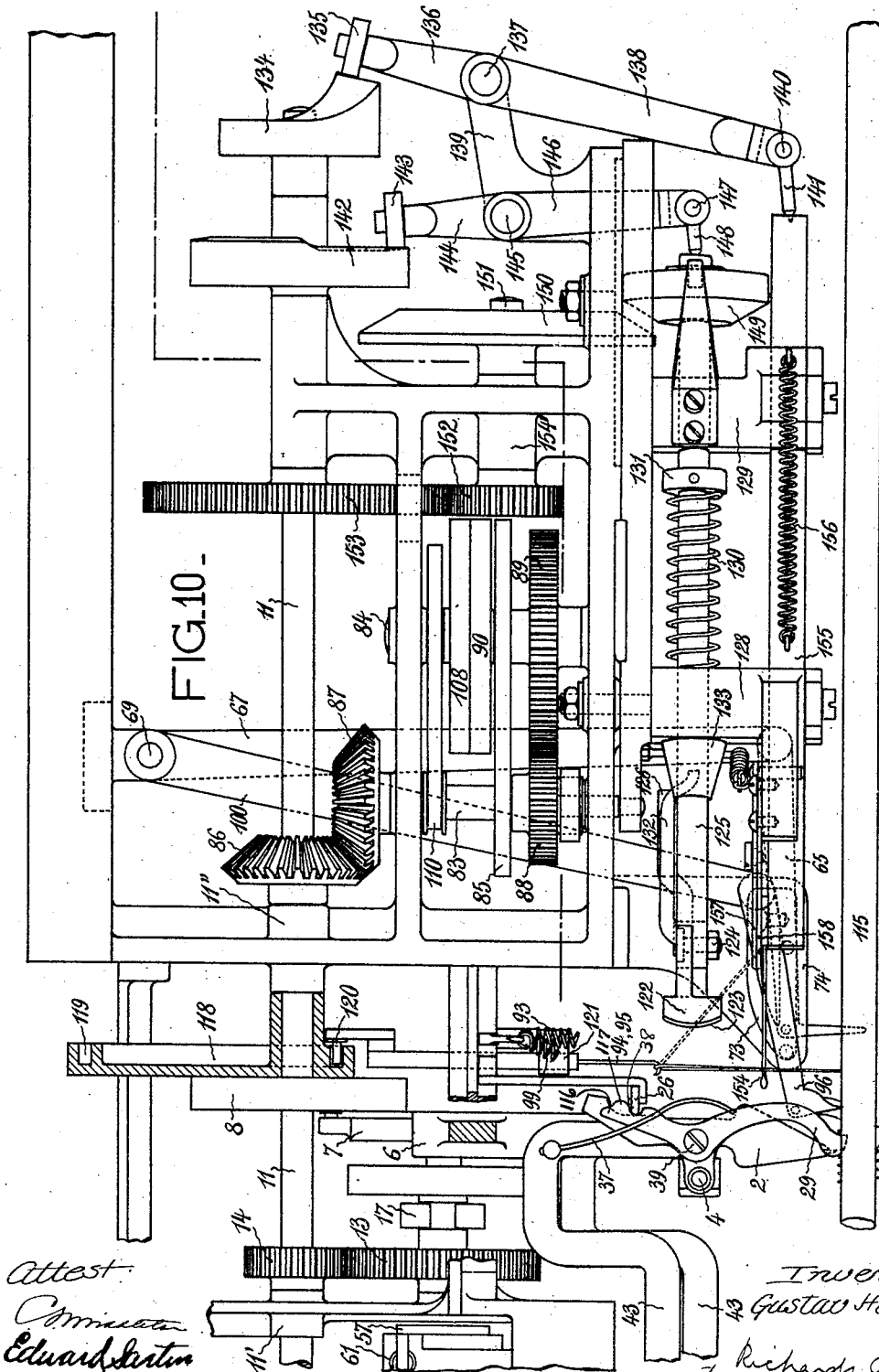
Attest:
C. Minuate
Edward Sartin
Inventor
Gustav Hiller
By Richards
Attys No. 787,511. PATENTED APR. 18, 1905.
G. HILLER.
WARP TWISTING MACHINE.
APPLICATION FILED JAN. 4, 1904.
8 SHEETS—SHEET 8.
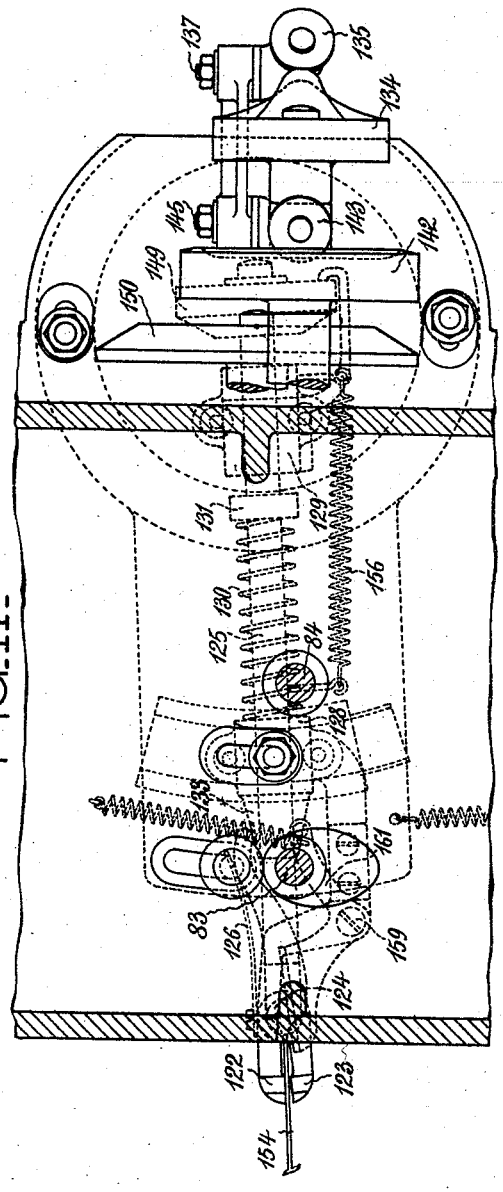
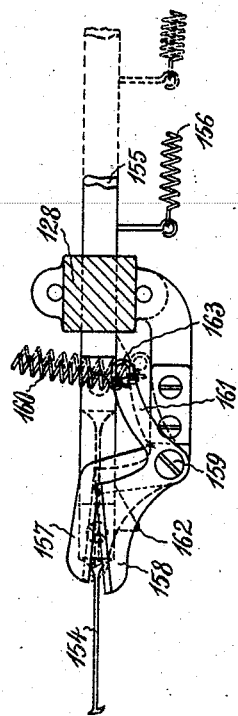
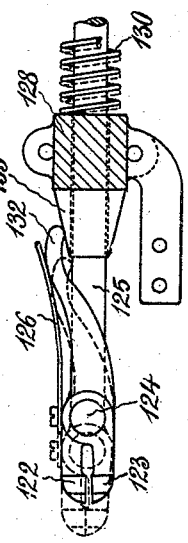
Attest:
C. Minnelton
Edward Saxton
Inventor
Gustav Hiller
By Richards & Co
Attys No. 787,511.

Patented April 18, 1905.

UNITED STATES PATENT OFFICE.

GUSTAV HILLER, OF ZITTAU, GERMANY.

WARP-TWISTING MACHINE.

SPECIFICATION forming part of Letters Patent No. 787,511, dated April 18, 1905.

Application filed January 4, 1904. Serial No. 187,718.

*To all whom it may concern:*

Be it known that I, GUSTAV HILLER, a subject of the King of Saxony, residing at 1$^b$ Eisenbahnstrasse, Zittau, in the Kingdom of Saxony and Empire of Germany, have invented new and useful Improvements in and Relating to Warp-Twisting Machines, of which the following is a specification.

My invention relates to warp-twisting machines.

It comprises a device for separating the ends of the warp-threads to be twisted from the unfinished lease and for quickly removing the twisted warp-threads, the ends of the warp-thread of the unfinished lease—that is to say, of the old and of the new warp—being suitably gripped in a clamp with the object of forming a lease. From this the two ends of the warp-thread which are to be twisted together are removed by means of an engaging device with two engaging hooks, each of which takes hold of one end of the warp-thread and conveys it to the twisting-tool—for instance, a rotary pair of tongs. To insure this operation being carried out accurately and safely, care must be taken that the two warp ends to be twisted are completely separated from the unfinished lease before being gripped by the hooks. This is brought about by means of separators moving to and fro in the lease along the warp between the ends of the threads to be separated and the unfinished lease; but even these separators are only then able to come safely between the ends of the threads to be separated and the unfinished lease if the ends of the threads to be separated have already been lifted from the unfinished lease. This is accomplished in the present invention by means of several pairs of pushers operating in turn above and below in the lease. These pushers have an upward and downward motion, and in addition they are swung forward whenever they reach their working position above or below in the lease. In consequence of this forward movement of the pushers the unfinished lease is pressed forward while the ends of the threads to be twisted are left free. Consequently an open space is left through which the separators can come between the warp ends and the lease. By means of a backward-swinging movement of the separators the ends of the threads to be twisted, which by now are completely parted by these separators from the unfinished lease, are carried to conveying-hooks, which on their part guide the warp ends over the engaging hooks at that moment in their lowest position. If the machine is worked quickly, it may easily happen that the already-twisted warp is again gripped by the working parts of the machine, and the possibility of the already-twisted warp being mixed up with the next piece of thread to be twisted is likewise not excluded. Consequently it becomes necessary to remove quickly the already-twisted warp-thread from close contact with the working mechanism. To enable this to be done, the twisted warp-thread is gripped in the present invention from above, while the twisting takes place by means of two hooks, which execute a forward, downward, and backward movement and in this manner pull the already-twisted warp-thread backward and lay it against the finished lease.

In the accompanying drawings I have shown how my invention may be carried into effect.

Figure 7:
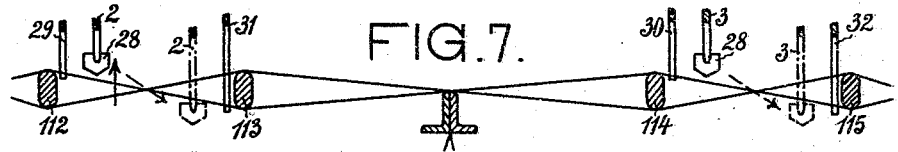
Figure 8:
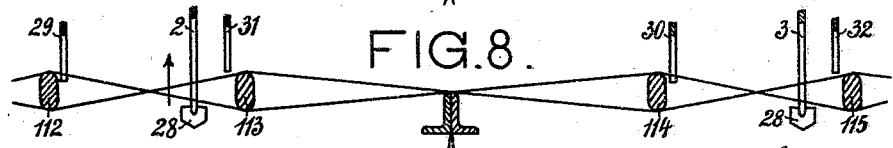
Figure 9:
Figure 2:
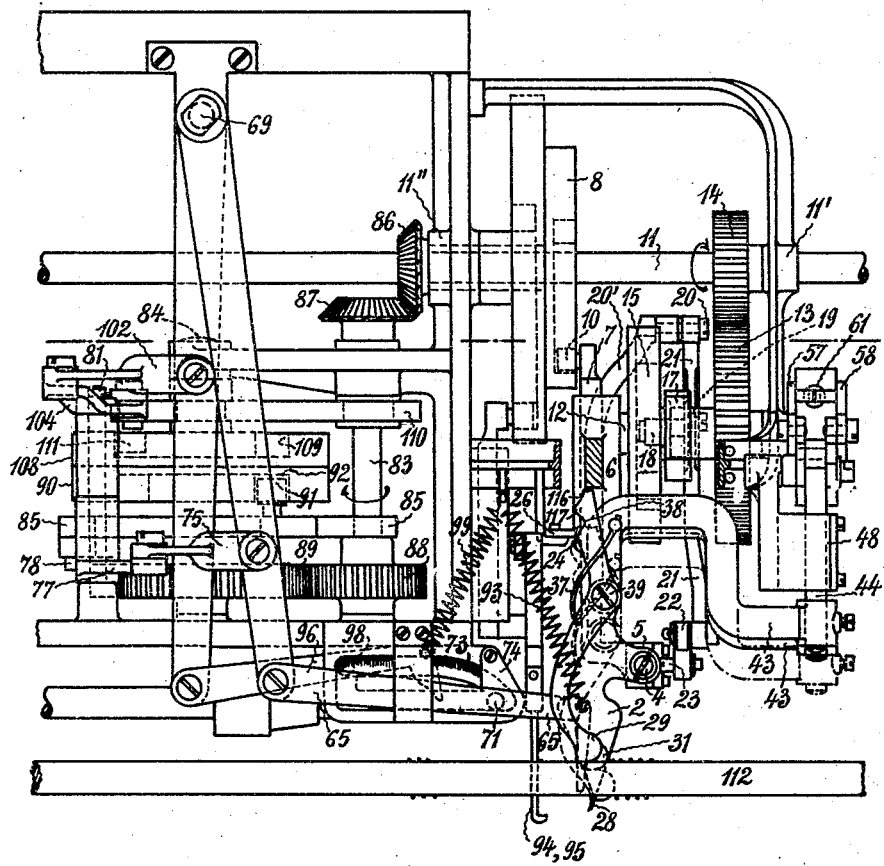
Figure 3:
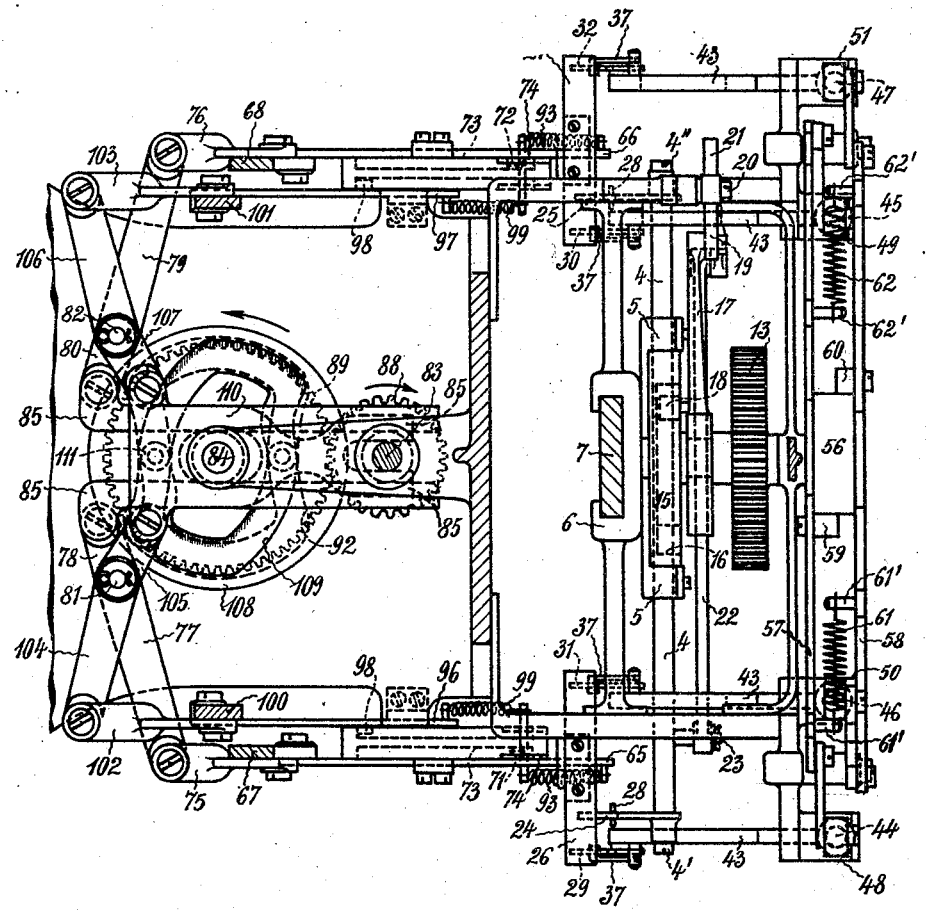
Figure 4:
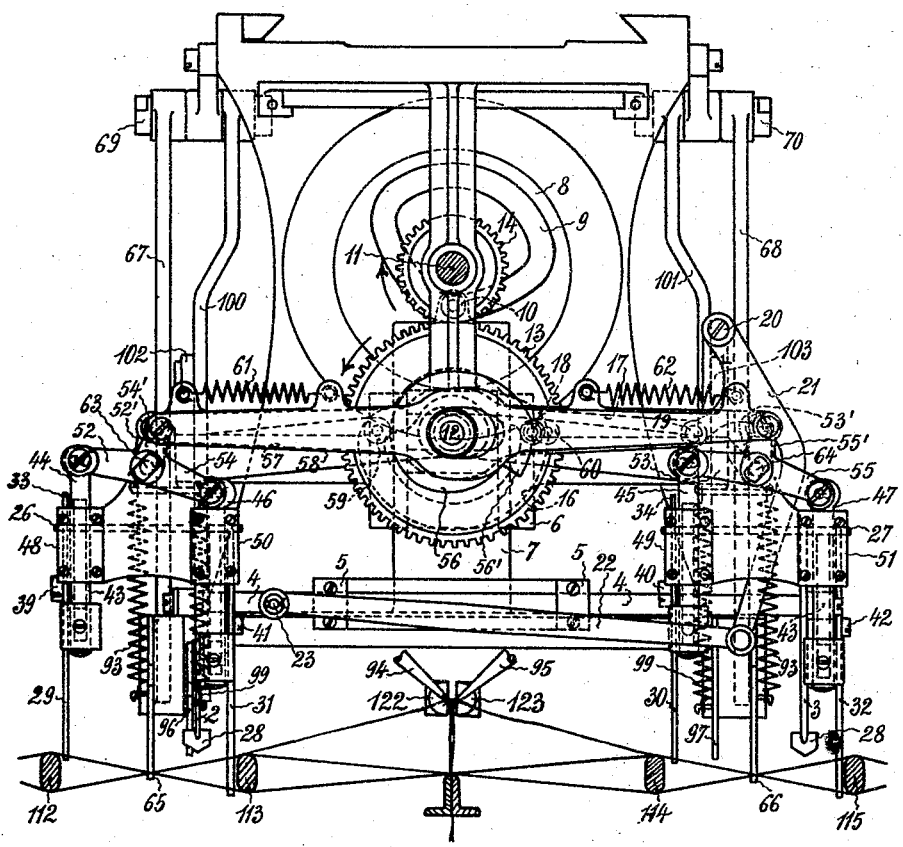
Figure 5:
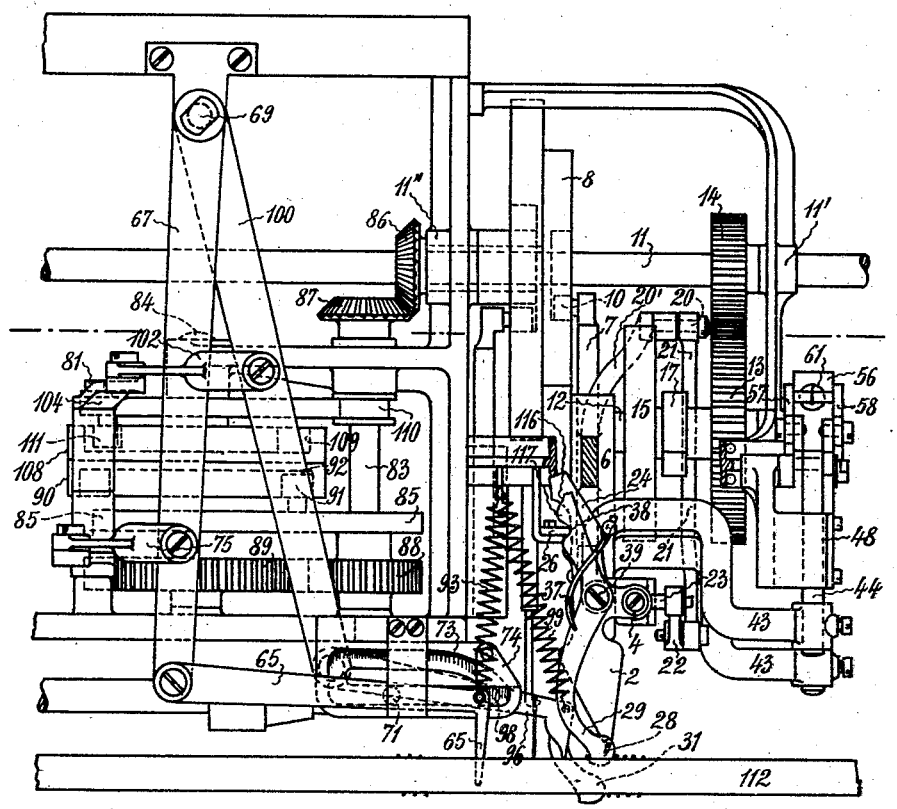
Figure 6:
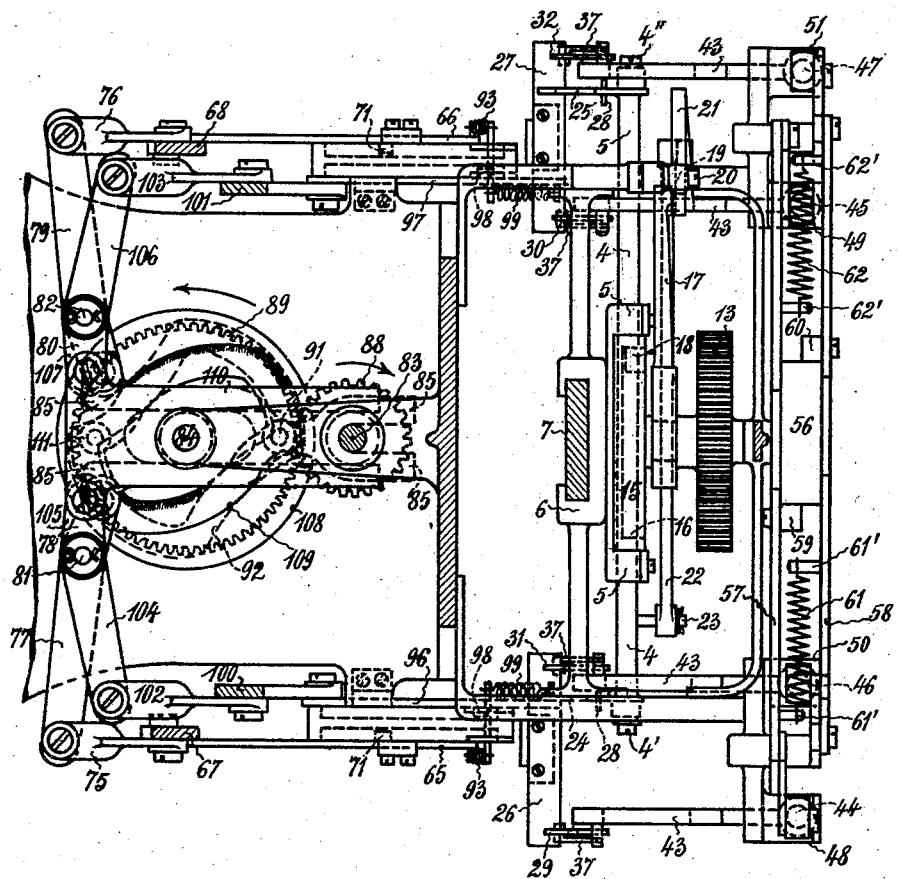

Figure 1 is a front view, Fig. 2 is a side view, and Fig. 3 a plan, of the machine. Figs. 4 to 6 show the same views of the machine after the principal shaft has made in this instance three-quarters of a revolution. Figs. 7 to 9 show diagrammatically the cross-section of the separating and lifting devices in their different working positions. Fig. 10 is a side elevation of the thread-separating device in connection with the chief mechanism of the warp-twisting machine. Fig. 11 is a plan showing a detail arrangement of the warp-twisting machine. Fig. 12 is a plan of the twisting nippers or tongs. Fig. 13 is a plan of an inserting-hook.

In Figs. 1, 2, 4, and 5 the separators are denoted by 2 and 3. Each of them is mounted on pins 4' 4'' at one end of a cross-bar 4 in such a manner that they can swing in a direction transversely to the run of the warp-thread. The cross-bar 4 moves to and fro in a direction parallel with the run of the warp-thread in slots 5, (compare Figs. 3 and 6,) arranged in a common support 7, which moves up and down in a slot 6 in the framework of the machine. The upward and downward movement of the support is regulated by means of a grooved cam 8, Figs. 1, 2, 4, 5, mounted on the principal shaft 11, in the groove of which cam engages a roller 10, mounted rotary on the support 7. The principal shaft 11 is mounted on bearings 11' 11" of the framework of the machine in a direction transverse to the run of the warp-thread. A shaft 12 is actuated by the principal shaft 11 by means of cog-wheels 13 14, which are geared to a ratio of one to two. The shaft 12 is mounted in the frame of the machine below and is parallel to the principal shaft 11. On it is seated a cam-wheel 15, in the groove of which engages the roller 18, attached to a connecting-rod 17, which has a slot through which the shaft 12 passes. The end of the connecting-rod is jointed at the point 19 with a lever 21, rotating round a bolt 20. The latter is rigidly attached to an arm 20', provided on the guide 6. The free end of the lever 21 is connected with the cross-bar 4 by means of a connecting-rod 22, which engages with the pin 23 of the cross-bar 4. Consequently during every two revolutions of the principal shaft 11 one reciprocating movement of the cross-bar 4 is effected by means of the eccentric 15, the bearer 7 of the cross-bar being once raised and lowered by means of the eccentric 8 during each reciprocating motion of the cross-bar. The separators 2 and 3, which are attached to the cross-bar 4, participate in this reciprocating motion and in the raising and lowering and have besides this a swinging movement round their pivots 4' 4" each time they reach their lowest position. With this object in view the separators 2 and 3 are furnished with extension-pieces 24 and 25 beyond their pivots 4' 4", and guide-rails 26 27 are fixed to the frame of the machine. The arrangement of the guide-rails in relation to the separators is such that the extension-pieces 24 25 constantly press against the guide-rails, a circumstance due to the greater weight of the separators. The ends of the extension-pieces 24 25 are bent down toward the guide-rails 26 27, and as soon as at the close of the downward movement of the separators 2 and 3 these bent-down ends come in contact with the guide-rails the separators 2 and 3 are swung backward and convey the separated ends of the warp-threads of the old and of the new warp to the parts of the contrivance by means of which the further conveyance backward of the warp-threads is brought about, an arrangement which enables these parts to engage the warp-threads more safely.

The separators 2 and 3 are wedge-shaped and furnished at their lower end with scoop-like pieces 28, the planes of which run parallel to the warp-threads.

To enable the separators 2 and 3 to come easily between the ends of the warp-threads to be twisted and the unfinished lease, the latter is pushed backward and kept there by means of the pairs of pushers 29 30 and 31 32 until the ends of the warp-threads to be twisted are completely separated. The adjoining pushers of each pair of pushers—viz., 29 31 and 30 32—act always together in moving the same end of the warp-thread, the one high up, the other low down in the lease close to the rods 112 113 and 114 115. If not in action, the pushers occupy as high a position as possible above the warp-threads. The individual adjoining pushers of each pair have in turn a downward movement toward the threads high up or low down in the lease in accordance with what happens to be the oblique position for the time being in the lease of the ends of the warp-threads to be separated. This downward movement is executed simultaneously by all the pushers until they reach that temporary working position high up or low down in the lease in which is imparted to them compulsorily that forward pushing motion by means of which the unfinished lease is pushed forward. Before the separated ends of the warp-threads are taken back by the separators the pushers working for the time being low down in the lease spring quickly upward into the highest position, and so make room for the passage of the threads to be taken back. The pushers working high up in the lease retain, meanwhile, their working position and hold the unfinished lease back. The individual pushers 29 30 and 31 32 are two-armed levers of similar construction, the upper arms 33 34 35 36 of which are pressed by means of springs 37 continuously against the already mentioned and described guide-rails 26 and 27 and are furnished on the side turned toward the guide-rails with a projection 117, situated between two recesses 38 and 116. Of the two recesses 38 and 116 the first, 38, becomes effective whenever the pushers work high up in the lease, the latter, 116, whenever they work low down. The pivots 39 40 and 42 of the pushers are attached to bent supports 43, each of which is adjustably attached to a slide-bar 44 46 and 45 47 by means of adjusting-screws. The slide-bars 44 45 46 47 are movable up and down in guides 48 49 50 51 arranged on the frame of the machine and are moved up and down by means of bent levers 52 54 and 53 55, which are mounted on pivots 63 and 64, attached to the frame of the machine. The second arms 52' 54' 53' 55' of these bent levers are pivotally attached to the end of two connecting-bars 57 and 58. These connecting-rods are actuated by means of a mutual cam 56, against the different sides of which they are held by means of rollers 59 and 60 and pressed by springs 61 and 62. An end of each of the latter is attached to the connecting-rod 57 and the other end to the connecting-rod 58 and that by pins 61' and 62' on the connecting-rods. By the action of the cam 56 one of the pushers of each pair of pushers—for instance, 29 and 30—is lowered to the lowest position for the purpose of working low down in the lease by means of the projection 56' of the cam 56 actuating the connecting-rod 57, (compare position indicated by dotted lines in Figs. 1 and 2, as well as Fig. 9,) while the two other pushers of the two pairs of pushers are brought into the operating position high up in the lease by the action of that part of the cam 56 which is opposite to the projection 56' of the cam 56 on the connecting-rod 58. (Compare Figs. 1, 2, and 9.) When the pairs of pushers are lowered, the recesses 38 or 116, according to the working position of the pushers for the time being of the upper arms 33 34 35 36 of the pushers, come in contact with the guide-rails 26 27, and the pushers in the working position occupied at the moment are swung forward by means of the springs, Figs. 2 and 5. The cam 56 is so shaped that that part of its circumference which is opposite to its projection 56' is for some length concentric to the shaft on which it is mounted, Figs. 1 and 4. It is due to this that the pushers, which for the time being operate high up in the lease, remain in consequence of the temporary stoppage of the connecting-rod 57 or 58 in their working position. The other connecting-rod 58 or 57, however, flies back into its first position as soon as the projection 56' of the cam has ceased to be in contact with the roller 60 or 59 of the corresponding connecting-rod, Fig. 1, full lines. In consequence of this the two pushers working low down in the lease—for instance, 29 and 30—fly upward into the highest position, and are therefore conveyed, by means of the sliding of the projections 117, over the guide-rails 26 27, past the threads of the unfinished lease lying high up in the lease without touching them. If in the highest position, the pushers with their upper arms beneath the recesses 38 rest against the guide-rails 26 27—that is to say, they are bent backward. After the pushers operating for the time being low down in the lease have flown upward the separators 2 and 3 reach their lowest position and while in it swing backward in the manner already described and carry both the separated ends of the warp-threads with them. As soon as the two ends of the warp-threads are completely separated from the unfinised lease by the separators the conveying-hooks 65 and 66 are lowered onto them from above. These hooks are flexibly attached or jointed to oscillatory members 67 68, which oscillate round fixed bolts 69 70, attached to the frame of the machine. The conveying-hooks 65 66 move by means of the bolts 71 72, with which they are furnished, in endless guide-grooves 73, rigidly attached to the frame of the machine, the lower part of the groove being separated from the upper part by the automatic switch 74. The oscillatory members 67 68 by means of short rods are flexibly connected with the longer arms 77 79, Figs. 3 and 6, of the two-armed levers 77 78 or 79 and 80. These two-armed levers rotate round spindles 81 or 82, arranged vertically and rigidly on the frame of the machine, while their other arms 78 or 80 engage with a slide 85, surrounding the vertical shafts 83 and 84 and having a to-and-fro movement imparted to it. The shaft 83, Fig. 2, transmits, by means of a pair of bevel-wheels 86 87, geared at the ratio of one to one, and of a pair of cog-wheels 88 89, geared at the ratio of one to two, the motion of the shaft 11 to the shaft 84, causing the latter to rotate with the same speed as the shaft 12. On the shaft 84 is mounted a cam 90, in the groove 92 of which engages a roller 91, arranged to rotate on the slide 85. The groove 92 is such as to impart a twofold to-and-fro motion to the conveying-hooks during each revolution of the shaft 84. If the shaft 84 is geared at the same ratio as the shaft 11, a groove may be used which moves the conveying-hooks only once to and fro during each revolution of the shafts. The conveying-hooks 65 66 are drawn upward by means of springs 93, Fig. 2. When moving forward, they are in the upper portion of their guide-grooves 73, the front of which upper portion is inclined downward and gradually enters the lower portion. While so moving the conveying-hooks are lowered over the free ends of the warp-threads. In the front part, which is inclined downward, of the upper portion of the guide-groove 73 the pin 71 pushes the automatic switch 74 aside, the switch swinging back as soon as the pin 71 has passed, and thereby preventing it from reëntering the upper portion. Consequently while moving backward the conveying-hooks 65 66 move along the lower portion of the guide-grooves 73—that is to say, they are in a lowered position to reënter again at the end of this portion of the groove the upper part, drawn there by the springs 93. In consequence of this backward movement of the conveying-hooks 65 66 while in the lowered position the ends of the warp-threads to be twisted are conveyed to the two engaging hooks 94 95, which are then in their lowest position, and therefore able to safely grip the ends of the warp-threads and to convey them to the twisting-tool. If the twisted thread were simply allowed to drop, there is a danger, due to the great speed of the contrivance, that the twisted thread, which in consequence of its tendency to untwist oscillates violently, might get mixed up with the other ends of the warp-thread taken hold of by that time by the engaging hooks 94 95 or that it might pull them off again from the engaging hook. In either case it becomes difficult or impossible to properly carry out the twisting of the succeeding ends of threads to be twisted. To avoid this danger, the hooks 96 97 for bringing back the threads are already placed over the ends of the warp-threads while these are being lifted and twisted. In consequence of a forward and downward movement of these hooks the twisted threads are already held fast by them when allowed to drop from the twisting device. Having gripped the threads, these hooks have imparted to them a backward movement in the course of which the thread is conveyed back to the finished lease either before the engaging hooks are again lowered or beneath them if the engaging hooks have already started to move downward. The hooks for carrying back the thread likewise move on pins 98 in guide-grooves, which are identical with the guide-grooves 73, (shown in Figs. 2 and 3,) and are arranged on the opposite side of the frame of the machine. The hooks 96 97, drawn upward by means of drawing-pins 99, are flexibly attached or jointed to oscillatory members 100 101. The latter rotate round pins 69 70 and are connected, by means of rods 102 103, with the arms 104 and 106 of the two-armed levers 104 105 and 106 107. These levers rotate round the immovable vertical spindles 81 82 and engage with their shorter arms 105 and 107 a slide 110, which surrounds the shafts 83 84 in the same manner as the slide 85 and travels along it. A roller 111, mounted on the slide 110, engages with the grooves 109 of a second cam 108, mounted on the shaft 84 above the cam 90. The action of the groove 109 is the same as that of the groove 92 and at the beginning of the working operation is about one-eighth of a revolution behind it. Consequently the hooks for carrying the threads back likewise execute two full working movements during each revolution of the shaft 84 and when traveling backward along the lower part of their guide-grooves behave in the same manner as the conveying-hooks when traveling forward in the upper part of theirs, because the action of their guide-grooves coincides completely with that of the guide-grooves 73.

The operation of the device is as follows: The two ends of the warp-threads, lying in two and twos, are taken up by one or the other pusher 29 31 or 30 32 of the pairs of pushers in such a manner that the one pusher takes hold of them high up in the lease and the other low down in it, Figs. 1 and 7 to 9, and pushes them back, together with the unfinished lease, while the separators 2 and 3 are engaged in their downward movement. Thereupon those of the pushers of the pairs of pushers which have finished operating low down in the lease fly upward into their highest position in order that they may not interfere with the backward movement of the separators 2 and 3 and with those parts of the ends of the warp-threads to be twisted which are in front of them high up in the lease. When the end of their downward movement is reached, the separators 2 and 3 swing backward and carry the ends of the warp-threads beneath the conveying-hooks 65 and 66, which have meanwhile been moved forward. Then the separators move again upward, while simultaneously swinging forward, and when again moving downward come between the unfinished lease, in the meantime pushed back by suitably-actuated pushers, and the ends of the warp-threads next in order to be twisted. Meanwhile the engaging hooks 94 95 have reached their lowest positions, and the hooks for bringing the threads back, which at this moment are engaged in moving backward, draw toward them the ends of the threads to be twisted. While the engaging hooks move upward and transmit the ends of the threads to the twisting-tool the conveying-hooks 65 66 remain in their position until the hooks for carrying the thread back are safely lowered over the ends of the threads to be twisted and only then fly quickly upward. After the twisting of the ends of the thread is finished the hooks for conveying the thread back again have a backward movement for the purpose of conveying the twisted thread beneath the engaging hooks to the finished lease. Consequently the finished twisted thread is removed from the vicinity of the working parts of the contrivance immediately after being released, and cannot therefore be the cause of any inteference whatever. The upward-and-downward movement of the gripping-hooks 94 95 is effected through the agency of a cam-disk 118, Fig. 10, in the groove 119 of which engages a hook-shaped projection 120 at the upper ends of the gripping-hooks 94 95. These ends are adapted to move in a guide 121, secured to the frame of the machine. Of the jaws 122 123 of the twisting tongs or nippers, Figs. 10, 11, 12, the former jaw is fixed, while the latter jaw is adapted to turn about a transverse pin 124 and fixed to a spindle 125, capable of turning in guides 128 129 of the frame of the machine, Fig. 10, and supported so that it can be displaced axially in opposition to a spring 130. This spring acts between the guide 128 and an adjustable ring 131, provided upon the said spindle 125. The movable jaw 123 of the tongs has an arm 132, the free end of which can slide upon a cone 133, fixed to the said guide 128. By means of a spring 126 the free end of the arm 132 is continually forced against the periphery of the cone 133. In consequence of the forward movement of the spindle 125 in opposition to the spring 130 the free end of the arm 132 is caused to slide toward the apex of the cone 133, so that the jaw 124 of the tongs is released under the action of the spring 126, which forces the same to its closed position, as shown in Figs. 10 to 12. The spindle 125 receives its forward movement in opposition to the spring 130 through the agency of a cam-disk 142 on the shaft 11, against which a roll 143 on the arm 144 of a two-armed lever 144 146 is pressed, the said spindle 125 being forced by the spring 130 against a center pin 148, which is fixed by a joint 147 to the arm 146 of the lever 144 146, arranged to turn about a fixed journal 145. In the forward position the spindle when the tongs are closed receives its turning movement for twisting the ends of the two threads. For this purpose the spindle 125 carries a friction-cone 149, which in the forward movement of the spindle is forced against a friction-cone 150. This cone is provided upon a shaft 151, supported at 154' in the frame of the machine and continuously driven by spur-wheels 152 153 from the shaft 11. The ends of the threads which are to be twisted and which have been raised by the gripping-hooks 94 95 are inserted between the open jaws by an inserting-hook 154, arranged to be moved horizontally forward and backward. This hook is secured to a slide-rod 155, which can be displaced longitudinally in the guides 128 129, but not turned. The forward displacement is effected in opposition to a spring 156 by a cam-disk 134 upon the shaft 11. To this end the arm 136 of a two-armed lever 136 138 has at its free end a roll 135, forced against the cam-disk 134, the slide-rod 155 being continually pressed by the spring 156 against a center pin 141, secured by means of the joint 140 to the arm 138 of the lever 136 138. In the forward movement through the cam-disk the inserting-hook 154 takes hold of the ends of the threads which are to be twisted and which have been seized by the gripping-hooks 94 95 in order to introduce them in its return movement effected by the spring 156 between the open jaws of the tongs. (Position indicated in dotted lines, Fig. 10.) At the same moment the tongs moved forward are closed and begin to turn, while the ends of the threads are cut off to a certain length by scissors. The scissors are shown in Figs. 10, 11, and 13, the former figure being a side elevation and the latter two figures being plans of the same. One shank, 158, of the scissors is fixed immovably to the guide 128, while the other shank is movably connected with the first by a pin 159. A spring 160 is provided to maintain the same continually in its open position, the said spring acting upon a rearward extension 161. In the return movement of the slide-rod 155 a nose 162 provided thereon acts upon a pin 163 on the extension 161 of the shank 158 of the scissors in opposition to the spring 160 in order to close the scissors for the cutting, Fig. 13.

What I claim as my invention, and desire to secure by Letters Patent, is—

1. In a warp-twisting machine of the character described, the combination with means for twisting the ends of warp-threads, separators for dividing the ends of the threads from the unfinished lease, of pairs of pushers acting above and below in the lease for pushing away the unfinished lease for the entrance of the separators, means for giving the pushers an upward-and-downward movement and means for giving said pushers a forward-and-backward oscillating movement, substantially as and for the purpose herein set forth.

2. In a warp-twisting machine of the character described, the combination of means for twisting the ends of warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement and means for the forward-and-backward oscillation of the pairs of pushers, substantially as and for the purpose herein set forth.

3. In a warp-twisting machine of the character described, the combination of means for twisting the ends of warp-threads, gripping-hooks for introducing the ends of the threads to be twisted, means for the upward-and-downward movement of the gripping-hooks, separators for dividing the ends of the threads from the unfinished lease, means for the to-and-fro movement of the separators in the lease, means for oscillating the separators transversely to the lease, means for the upward-and-downward movement of the separators, inserting-hooks for conducting the ends of the threads to be twisted over the lowered gripping-hooks, and means for raising and lowering and for the forward-and-backward movement of the inserting-hooks, substantially as and for the purpose herein set forth.

4. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement, means for the forward-and-backward oscillation of the pairs of pushers, gripping-hooks for introducing the ends of the threads to be twisted, and means for the upward-and-downward movement of the gripping-hooks, substantially as and for the purpose herein set forth.

5. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement and means for the forward-and-backward oscillation of the pairs of pushers, gripping-hooks for introducing the ends of the threads to be twisted, means for the upward-and-downward movement of the gripping-hooks, inserting-hooks for conducting the ends of the threads to be twisted over the lowered gripping-hooks, and means for raising and lowering and for the forward-and-backward movement of the inserting-hooks, substantially as and for the purpose herein set forth.

6. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement and means for the forward-and-backward oscillation of the pairs of pushers, gripping-hooks for introducing the ends of the threads to be twisted, means for the upward-and-downward movement of the gripping-hooks, inserting-hooks for conducting the ends of the threads to be twisted over the lowered gripping-hooks, means for raising and lowering and for the forward-and-backward movement of the inserting-hooks, and means for bringing the finished threads positively, and directly after the release from the means for the twisting, out of the reach of the operating parts and for laying the same upon the finished part of the lease, substantially as and for the purpose herein set forth.

7. In a warp-twisting machine of the character described, the combination of means for twisting the ends of warp-threads, separators for dividing the ends of the threads from the unfinished lease, a slide-rod upon which the separators are adapted to oscillate, means for guiding the slide-rod parallel to the threads, means for the to-and-fro movement of the slide-rod in the guides, and means for raising and lowering its guides, means for vertically guiding the latter, upwardly-extending arms on the separators, fixed guides for these arms, projections directed toward the guides and provided on the free ends of the arms, substantially as and for the purposes herein set forth.

8. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, holders adapted to be raised and lowered for the pushers capable of oscillating transversely thereon, vertical guides for the holders, bell-crank levers from which the holders are suspended, connecting-rods between the bell-cranks levers of the holders adapted to move simultaneously in the same direction, and means for the to-and-fro movement of the connecting-rods, substantially as and for the purpose herein set forth.

9. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, holders adapted to be raised and lowered for the pushers capable of oscillating transversely thereon, upwardly-extending arms on the pushers, fixed guides adapted for guiding the arms of the pushers, springs for continually forcing the arms of the pushers against the guides, and recesses provided in the arms of the pushers and turned toward the guides, substantially as and for the purpose herein set forth.

10. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement and means for the forward-and-backward oscillation of the pairs of pushers, gripping-hooks for introducing the ends of the threads to be twisted, means for the upward-and-downward movement of the gripping-hooks, inserting-hooks for conducting the ends of the threads to be twisted over the lowered gripping-hooks, means for raising and lowering and for the forward-and-backward movement of the inserting-hooks, hooks for taking back the twisted ends of the threads, and means for raising and lowering and for the forward-and-backward movement of the said hooks for taking back the twisted ends, substantially as and for the purpose herein set forth.

11. In a warp-twisting machine of the character described, the combination of means for twisting the ends of warp-threads, gripping-hooks for introducing the ends of the threads to be twisted, means for the upward-and-downward movement of the gripping-hooks, separators for dividing the ends of the threads from the unfinished lease, means for the to-and-fro movement of the separators in the lease, means for oscillating the separators transversely to the lease, means for the upward-and-downward movement of the separators, inserting-hooks for guiding the twisted ends of the threads over the lowered gripping-hooks, swings to which the inserting-hooks are jointed, endless guides for guiding the inserting-hooks during the whole movement and springs for continually raising the inserting-hooks, substantially as and for the purpose set forth.

12. In a warp-twisting machine of the character described, the combination of means for twisting the ends of warp-threads, gripping-hooks for introducing the ends of the threads to be twisted, means for the upward-and-downward movement of the gripping-hooks, separators for dividing the ends of the threads from the unfinished lease, means for the to-and-fro movement of the separators in the lease, means for oscillating the separators transversely to the lease, means for the upward-and-downward movement of the separators, inserting-hooks for guiding the twisted ends of the threads over the lowered gripping-hooks, swings to which the inserting-hooks are jointed, endless guides for guiding the inserting-hooks during the whole movement, an upper and a lower branch of the guides, an oblique connection in front between the two branches, and means for automatically closing the upper branch against the lower branch toward the inserting-hook guided in the said guides, substantially as and for the purpose herein set forth.

13. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement and means for the forward-and-backward oscillation of the pairs of pushers, gripping-hooks for introducing the ends of the threads to be twisted, means for the upward-and-downward movement of the gripping-hooks for conducting the ends of the threads to be twisted over the lowered gripping-hooks, means for raising and lowering and for the forward-and-backward movement of the inserting-hooks, taking-back hooks for laying the twisted thread upon the finished lease, swings to which the taking-back hooks are jointed, endless guides for guiding the taking-back hooks during the whole movement, and springs for continually raising the taking-back hooks, substantially as and for the purpose herein set forth.

14. In a warp-twisting machine of the character described, the combination of means for twisting the ends of the warp-threads, separators for dividing the ends of the threads from the unfinished lease, means for the to-and-fro movement of the separators in the lease, means for oscillating the separators transversely to the lease, means for the upward-and-downward movement of the separators, pairs of pushers acting above and below in the lease for pushing away the unfinished lease for the entrance of the separators, means for the upward-and-downward movement and means for forward-and-backward oscillation of the pairs of pushers, gripping-hooks for introducing the ends of the threads to be twisted, means for the upward-and-downward movement of the gripping-hooks for conducting the ends of the threads to be twisted over the lowered gripping-hooks, means for raising and lowering and for the forward-and-backward movement of the inserting-hooks, taking-back hooks for laying the twisted thread upon the finished lease, swings to which the taking-back hooks are jointed, endless guides for guiding the taking-back hooks during the whole movement, springs for continually raising the taking-back hooks, an upper and a lower branch of the guides, an oblique connection in front between the two branches, and means for automatically closing the upper branch against the lower branch toward the taking-back hooks guided in the said guides, substantially as and for the purpose herein set forth.

In testimony whereof I have signed my name to this specification in the presence of two subscribing witnesses.

GUSTAV HILLER.

Witnesses:
 Wm. J. Pike,
 Herbert Smith.